United States Patent
Bowers et al.

(10) Patent No.: US 10,356,344 B1
(45) Date of Patent: Jul. 16, 2019

(54) HIGH DYNAMIC RANGE IMAGING PIXELS WITH MULTIPLE EXPOSURES

(71) Applicant: SEMICONDUCTOR COMPONENTS INDUSTRIES, LLC, Phoenix, AZ (US)

(72) Inventors: Gabriel Bowers, Jerusalam (IL); Koji Hizume, Tokyo (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/008,221

(22) Filed: Jun. 14, 2018

(51) Int. Cl.
| | |
|---|---|
| *H04N 5/355* | (2011.01) |
| *H04N 5/235* | (2006.01) |
| *H04N 5/378* | (2011.01) |
| *H04N 5/372* | (2011.01) |
| *H04N 5/374* | (2011.01) |
| *H04N 5/3745* | (2011.01) |

(52) U.S. Cl.
CPC ....... *H04N 5/35581* (2013.01); *H04N 5/2355* (2013.01); *H04N 5/378* (2013.01); *H04N 5/3742* (2013.01); *H04N 5/37455* (2013.01)

(58) Field of Classification Search
CPC ........... H04N 5/35581; H04N 5/37455; H04N 5/3742; H04N 5/2355; H04N 5/378
See application file for complete search history.

(56) References Cited

U.S. PATENT DOCUMENTS

| | | | | |
|---|---|---|---|---|
| 6,947,085 | B1* | 9/2005 | Booth, Jr. | H04N 5/335 348/302 |
| 7,119,317 | B2 | 10/2006 | Ando et al. | |
| 2010/0309333 | A1* | 12/2010 | Smith | H04N 5/235 348/230.1 |
| 2012/0257079 | A1* | 10/2012 | Ninan | H04N 5/2355 348/222.1 |
| 2013/0308031 | A1 | 11/2013 | Theuwissen | |
| 2017/0099422 | A1* | 4/2017 | Goma | H01L 27/146 |
| 2018/0115725 | A1* | 4/2018 | Zhang | H04N 5/3745 |

FOREIGN PATENT DOCUMENTS

CN  105163044 A  12/2015

\* cited by examiner

*Primary Examiner* — Shahbaz Nazrul
(74) *Attorney, Agent, or Firm* — Treyz Law Group, P.C.; Joseph F. Guihan

(57) ABSTRACT

Image sensors may have high dynamic range (HDR) functionality. To implement the high dynamic range functionality, the image sensor may use multiple exposure imaging. In multiple exposure imaging, multiple images are captured with an image sensor at different exposure times and are later combined into a single high dynamic range image. Image data from one or more exposures in a multi-exposure imaging scheme may be used to determine that subsequent exposures will not produce useful information. To conserve power in the image sensor, certain readout circuitry such as analog-to-digital converter circuitry and column memory may be disabled during readout of the exposures that are determined to not produce useful information.

20 Claims, 4 Drawing Sheets

HIGH DYNAMIC RANGE IMAGING PIXELS WITH MULTIPLE EXPOSURES

BACKGROUND

This relates generally to imaging devices, and more particularly, to high dynamic range imaging sensor pixels.

Image sensors are commonly used in electronic devices such as cellular telephones, cameras, and computers to capture images. In a typical arrangement, an electronic device is provided with an array of image pixels arranged in pixel rows and pixel columns. Each image pixel in the array includes a photodiode that is coupled to a floating diffusion region via a transfer gate. Column circuitry is coupled to each pixel column for reading out pixel signals from the image pixels. The column circuitry often implements a correlated double sampling (CDS) procedure, which involves obtaining pixel signals by computing the difference between reset signals sampled during reset operations and image signals sampled following charge transfer operations.

An image sensor has an associated dynamic range, which is expressed as a ratio of the largest and smallest possible luminance values for the image sensor. Image sensors are often equipped with high dynamic range (HDR) functionality, in which the image sensors capture images at extended dynamic ranges beyond what would otherwise be possible using image sensors without HDR functionality. One of the most common HDR techniques is multiple exposure imaging. In multiple exposure imaging, multiple images are captured with an image sensor at different exposure times and are later combined into a single high dynamic range image. However, if care is not taken, performing HDR imaging may consume undesirably large amounts of power and may have increased sensor noise levels due to increased dark current from the high power consumption.

It would therefore be desirable to provide improved high dynamic range imaging techniques for image sensors.

DETAILED DESCRIPTION

Embodiments of the present invention relate to image sensors. It will be recognized by one skilled in the art that the present exemplary embodiments may be practiced without some or all of these specific details. In other instances, well-known operations have not been described in detail in order not to unnecessarily obscure the present embodiments.

Electronic devices such as digital cameras, computers, cellular telephones, and other electronic devices may include image sensors that gather incoming light to capture an image. The image sensors may include arrays of pixels. The pixels in the image sensors may include photosensitive elements such as photodiodes that convert the incoming light into image signals. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the pixels and readout circuitry for reading out image signals corresponding to the electric charge generated by the photosensitive elements.

Figure 1:
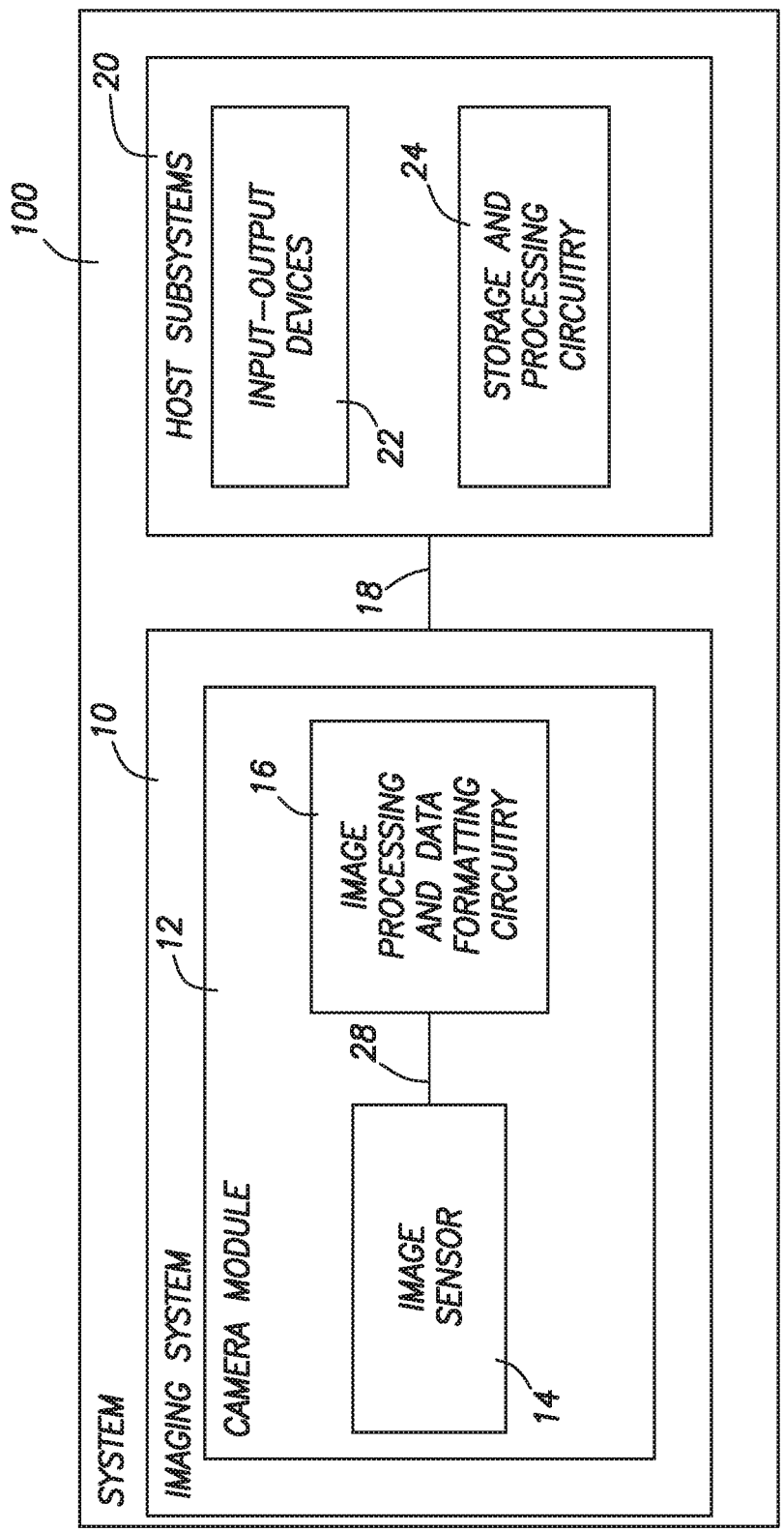
FIG. 1 is a diagram of an illustrative electronic device having an image sensor in accordance with an embodiment.

FIG. 1 is a diagram of an illustrative imaging and response system including an imaging system that uses an image sensor to capture images. System 100 of FIG. 1 may be an electronic device such as a camera, a cellular telephone, a video camera, or other electronic device that captures digital image data, may be a vehicle safety system (e.g., an active braking system or other vehicle safety system), or may be a surveillance system.

As shown in FIG. 1, system 100 may include an imaging system such as imaging system 10 and host subsystems such as host subsystem 20. Imaging system 10 may include camera module 12. Camera module 12 may include one or more image sensors 14 and one or more lenses.

Each image sensor in camera module 12 may be identical or there may be different types of image sensors in a given image sensor array integrated circuit. During image capture operations, each lens may focus light onto an associated image sensor 14. Image sensor 14 may include photosensitive elements (i.e., pixels) that convert the light into digital data. Image sensors may have any number of pixels (e.g., hundreds, thousands, millions, or more). A typical image sensor may, for example, have millions of pixels (e.g., megapixels). As examples, image sensor 14 may include bias circuitry (e.g., source follower load circuits), sample and hold circuitry, correlated double sampling (CDS) circuitry, amplifier circuitry, analog-to-digital converter circuitry, data output circuitry, memory (e.g., buffer circuitry), address circuitry, etc.

Still and video image data from camera sensor 14 may be provided to image processing and data formatting circuitry 16 via path 28. Image processing and data formatting circuitry 16 may be used to perform image processing functions such as data formatting, adjusting white balance and exposure, implementing video image stabilization, face detection, etc. Image processing and data formatting circuitry 16 may also be used to compress raw camera image files if desired (e.g., to Joint Photographic Experts Group or JPEG format). In a typical arrangement, which is sometimes referred to as a system on chip (SOC) arrangement, camera sensor 14 and image processing and data formatting circuitry 16 are implemented on a common semiconductor substrate (e.g., a common silicon image sensor integrated circuit die). If desired, camera sensor 14 and image processing circuitry 16 may be formed on separate semiconductor substrates. For example, camera sensor 14 and image processing circuitry 16 may be formed on separate substrates that have been stacked.

Imaging system 10 (e.g., image processing and data formatting circuitry 16) may convey acquired image data to host subsystem 20 over path 18. Host subsystem 20 may include processing software for detecting objects in images, detecting motion of objects between image frames, determining distances to objects in images, filtering or otherwise processing images provided by imaging system 10.

If desired, system 100 may provide a user with numerous high-level functions. In a computer or advanced cellular telephone, for example, a user may be provided with the ability to run user applications. To implement these functions, host subsystem 20 of system 100 may have input-output devices 22 such as keypads, input-output ports, joysticks, and displays and storage and processing circuitry 24. Storage and processing circuitry 24 may include volatile and nonvolatile memory (e.g., random-access memory, flash memory, hard drives, solid-state drives, etc.). Storage and processing circuitry 24 may also include microprocessors, microcontrollers, digital signal processors, application specific integrated circuits, etc.

System 100 may be a vehicle safety system. In a vehicle safety system, images captured by the image sensor may be used by the vehicle safety system to determine environmental conditions surrounding the vehicle. As examples, vehicle safety systems may include systems such as a parking assistance system, an automatic or semi-automatic cruise control system, an auto-braking system, a collision avoidance system, a lane keeping system (sometimes referred to as a lane drift avoidance system), a pedestrian detection system, etc. In at least some instances, an image sensor may form part of a semi-autonomous or autonomous self-driving vehicle. Vehicle safety standards may require that the proper operation of any component of a vehicle safety system (including the image sensor) be verified before, during, and/or after operation of the vehicle. Verification operations for the image sensor may be performed by the imaging system prior to and/or after operation of a vehicle (e.g., upon startup and/or shutdown of the imaging system).

Figure 2:
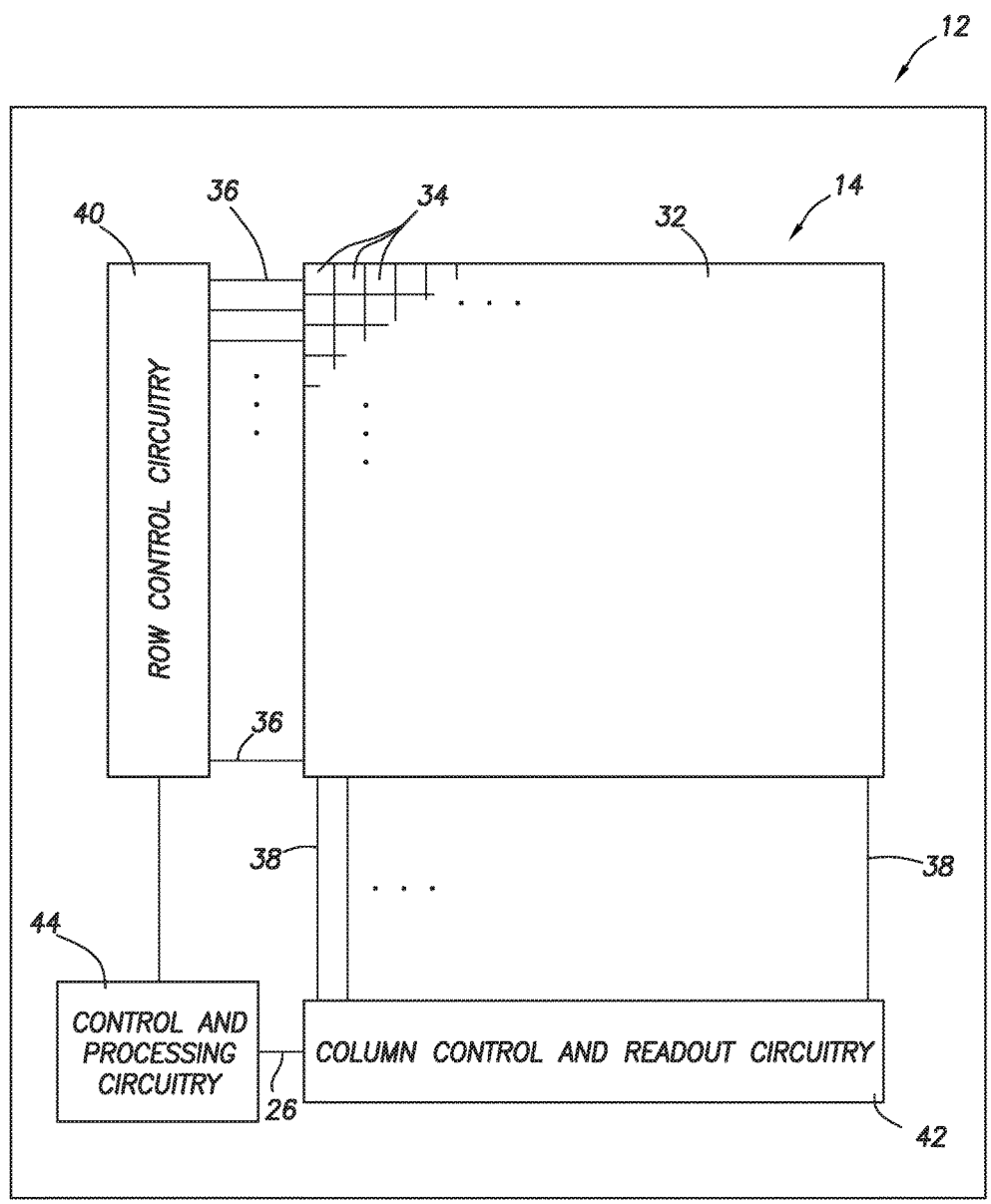
FIG. 2 is a diagram of an illustrative pixel array and associated readout circuitry for reading out image signals in an image sensor in accordance with an embodiment.

An example of an arrangement for camera module 12 of FIG. 1 is shown in FIG. 2. As shown in FIG. 2, camera module 12 includes image sensor 14 and control and processing circuitry 44. Control and processing circuitry 44 may correspond to image processing and data formatting circuitry 16 in FIG. 1. Image sensor 14 may include a pixel array such as array 32 of pixels 34 (sometimes referred to herein as image sensor pixels, imaging pixels, or image pixels 34). Control and processing circuitry 44 may be coupled to row control circuitry 40 and may be coupled to column control and readout circuitry 42 via data path 26. Row control circuitry 40 may receive row addresses from control and processing circuitry 44 and may supply corresponding row control signals to image pixels 34 over control paths 36 (e.g., dual conversion gain control signals, pixel reset control signals, charge transfer control signals, blooming control signals, row select control signals, or any other desired pixel control signals). Column control and readout circuitry 42 may be coupled to the columns of pixel array 32 via one or more conductive lines such as column lines 38. Column lines 38 may be coupled to each column of image pixels 34 in image pixel array 32 (e.g., each column of pixels may be coupled to a corresponding column line 38). Column lines 38 may be used for reading out image signals from image pixels 34 and for supplying bias signals (e.g., bias currents or bias voltages) to image pixels 34. During image pixel readout operations, a pixel row in image pixel array 32 may be selected using row control circuitry 40 and image data associated with image pixels 34 of that pixel row may be read out by column control and readout circuitry 42 on column lines 38.

Column control and readout circuitry 42 may include column circuitry such as column amplifiers for amplifying signals read out from array 32, sample and hold circuitry for sampling and storing signals read out from array 32, analog-to-digital converter circuits for converting read out analog signals to corresponding digital signals, and column memory for storing the read out signals and any other desired data. Column control and readout circuitry 42 may output digital pixel values to control and processing circuitry 44 over line 26.

Array 32 may have any number of rows and columns. In general, the size of array 32 and the number of rows and columns in array 32 will depend on the particular implementation of image sensor 14. While rows and columns are generally described herein as being horizontal and vertical, respectively, rows and columns may refer to any grid-like structure (e.g., features described herein as rows may be arranged vertically and features described herein as columns may be arranged horizontally).

If desired, array 32 may be part of a stacked-die arrangement in which pixels 34 of array 32 are split between two or more stacked substrates. In such an arrangement, each of the pixels 34 in the array 32 may be split between the two dies at any desired node within the pixel. As an example, a node such as the floating diffusion node may be formed across two dies. Pixel circuitry that includes the photodiode and the circuitry coupled between the photodiode and the desired node (such as the floating diffusion node, in the present example) may be formed on a first die, and the remaining pixel circuitry may be formed on a second die. The desired node may be formed on (i.e., as a part of) a coupling structure (such as a conductive pad, a micro-pad, a conductive interconnect structure, or a conductive via) that connects the two dies. Before the two dies are bonded, the coupling structure may have a first portion on the first die and may have a second portion on the second die. The first die and the second die may be bonded to each other such that first portion of the coupling structure and the second portion of the coupling structure are bonded together and are electrically coupled. If desired, the first and second portions of the coupling structure may be compression bonded to each other. However, this is merely illustrative. If desired, the first and second portions of the coupling structures formed on the respective first and second dies may be bonded together using any known metal-to-metal bonding technique, such as soldering or welding.

As mentioned above, the desired node in the pixel circuit that is split across the two dies may be a floating diffusion node. Alternatively, the desired node in the pixel circuit that is split across the two dies may be the node between a floating diffusion region and the gate of a source follower transistor (i.e., the floating diffusion node may be formed on the first die on which the photodiode is formed, while the coupling structure may connect the floating diffusion node to the source follower transistor on the second die), the node between a floating diffusion region and a source-drain node of a transfer transistor (i.e., the floating diffusion node may be formed on the second die on which the photodiode is not located), the node between a source-drain node of a source-follower transistor and a row select transistor, or any other desired node of the pixel circuit.

In general, array 32, row control circuitry 40, column control and readout circuitry 42, and control and processing circuitry 44 may be split between two or more stacked substrates. In one example, array 32 may be formed in a first substrate and row control circuitry 40, column control and readout circuitry 42, and control and processing circuitry 44 may be formed in a second substrate. In another example, array 32 may be split between first and second substrates (using one of the pixel splitting schemes described above) and row control circuitry 40, column control and readout circuitry 42, and control and processing circuitry 44 may be formed in a third substrate.

The image sensor of FIG. 2 may have high dynamic range (HDR) functionality. To implement the high dynamic range functionality, the image sensor may use multiple exposure imaging. In multiple exposure imaging, multiple images are captured with an image sensor at different exposure times and are later combined into a single high dynamic range image. For example, each imaging pixel may have three different exposures, each with a unique exposure time. Longer exposure times may be useful for gathering low light level information from the scene, whereas shorter exposure times may be useful for gathering high light level information from the scene.

In one embodiment, the exposure times may get progressively shorter. For example, the second exposure time may be greater than (e.g., more than three times greater than, more than six times greater than, more than ten times greater than, more than fifteen times greater than, etc.) the third exposure time. The first exposure time may be greater than (e.g., more than three times greater than, more than six times greater than, more than ten times greater than, more than fifteen times greater than, etc.) the second exposure time. This scheme is merely illustrative, and if desired other exposure orders may be used. For example, the exposure times may get progressively longer. For example, the second exposure time may be greater than (e.g., more than three times greater than, more than six times greater than, more than ten times greater than, more than fifteen times greater than, etc.) the first exposure time. The third exposure time may be greater than (e.g., more than three times greater than, more than six times greater than, more than ten times greater than, more than fifteen times greater than, etc.) the second exposure time.

The multiple exposures used for each pixel may be used to increase the dynamic range of the image sensor. The multiple exposures enable more useful image data to be obtained for any given scene. However, the image data obtained from the first exposure may indicate that the image data from subsequent exposures will not provide useful data. For example, consider the example in which a given pixel has three exposure times that get progressively shorter. The first exposure (which is the longest exposure) is intended to obtain low light level information from the scene. If the image data produced by the given pixel from the first exposure is below a predetermined threshold (indicating that the scene does in fact have low light levels for that pixel), it can be inferred that the subsequent exposures (which are intended to obtain higher light level information) will not produce any useful information. In other words, the light level is determined to be low in the first exposure, rendering the second and third exposures unnecessary (because the image data obtained in the second and third exposures will be so low that it is indistinguishable from noise).

Consider another example in which a given pixel has three exposure times that get progressively longer. The first exposure (which is the shortest exposure) is intended to obtain high light level information from the scene. If the image data produced by the given pixel from the first exposure is above a predetermined threshold (indicating that the scene does in fact have high light levels for that pixel), it can be inferred that the subsequent exposures (which are intended to obtain lower light level information) will not produce any useful information. In other words, the light level is determined to be high in the first exposure, rendering the second and third exposures unnecessary (because the image data obtained in the second and third exposures will be saturated).

To summarize, image data from one or more exposures in a multi-exposure imaging scheme may be used to determine that subsequent exposures will not produce useful information. To conserve power in the image sensor, certain readout circuitry (e.g., column circuitry) such as analog-to-digital converter circuitry and column memory may be disabled during readout of the exposures that are determined to not produce useful information.

Figure 3:
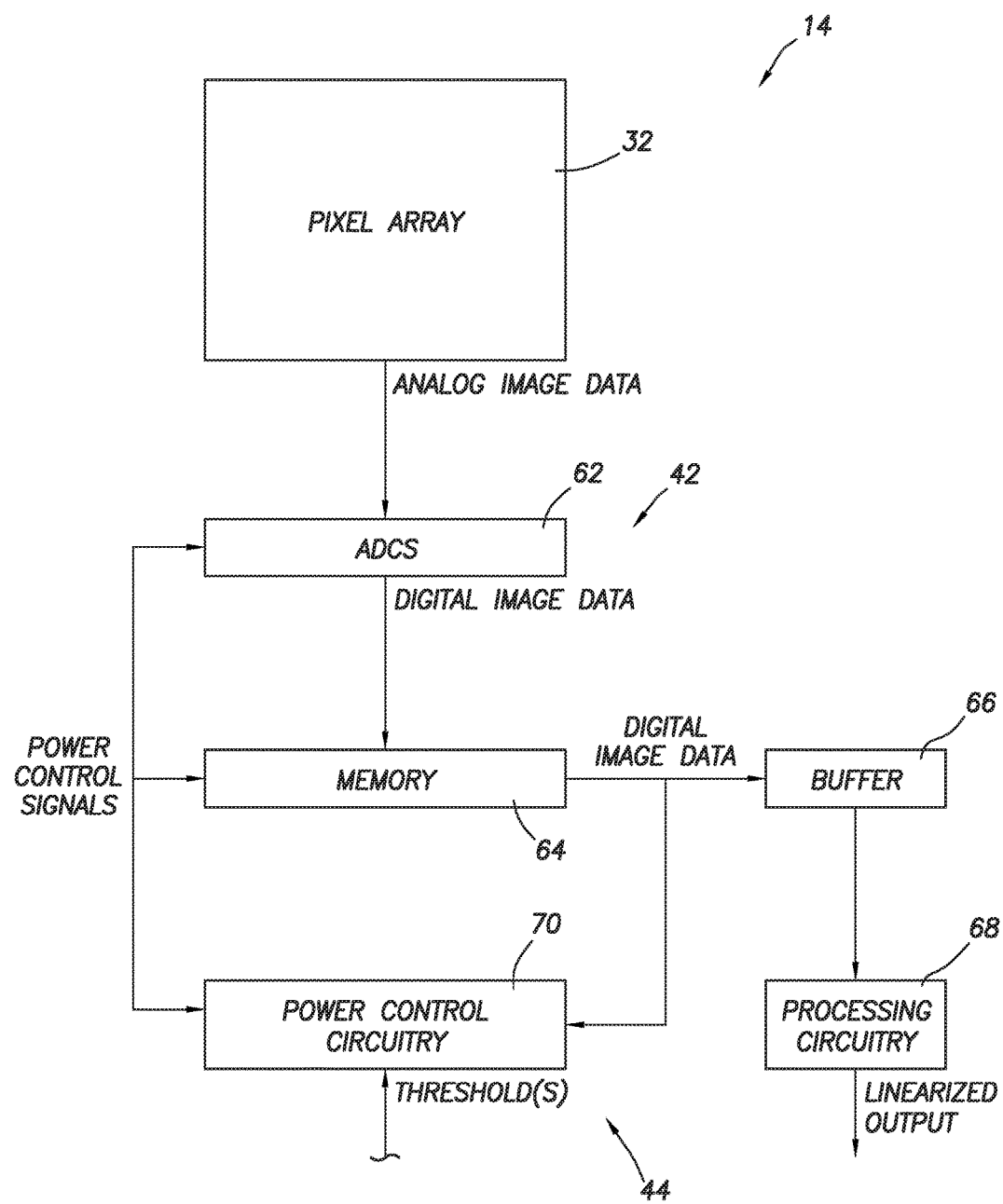
FIG. 3 is a diagram of an illustrative image sensor with power control circuitry for selectively disabling readout circuitry in accordance with an embodiment.

FIG. 3 shows an image sensor that includes power control circuitry for selectively disabling readout circuitry based on information from one or more initial exposures in a multi-exposure imaging scheme. As shown in FIG. 3, pixel array 32 may output analog image data to analog-to-digital converters (ADCs) 62. The analog-to-digital converters may convert the analog image data to digital image data. The digital image data may be output to memory 64. Memory 64 may be used for storing the digital image data.

The analog image data may be provided to ADCs 62 using a plurality of column lines (e.g., column lines 38 in FIG. 2). Each column line may be coupled to an analog-to-digital converter in ADCs 62. There may be one analog-to-digital converter for each column line in the array or less than one analog-to-digital converter for each column line in the array (e.g., each ADC may be coupled to two or more column lines if desired). Similarly, the output of each ADC may be coupled to one or more memory circuits. There may be one memory circuit for each ADC output or less than one memory circuit for each ADC output (e.g., each memory circuity may be coupled to two or more ADC outputs if desired). ADCs 62 and memory 64 may be considered part of column control and readout circuitry 42.

The digital image data may be output from memory 64 to buffer 66 (sometimes referred to as buffer circuitry 66). The digital image data conveyed from memory 64 to buffer 66 may be 12-bit digital image data. The digital image data may be the result of correlated double sampling subtraction operations. The data may pass through buffer 66 to processing circuitry 68. Processing circuitry 68 may linearize the image data and combine the image data from each exposure into a single representative output value (e.g., a high dynamic range image value). Each linearized output may be 20-bit digital data. If a combination of three exposures, the output may be a 20-bit digital output. If a combination of two exposures, the output may be a 16-bit digital output. If a combination of four exposures, the output may be a 24-bit digital output. These examples are merely illustrative and the output may have any desired number of bits.

The digital image data from memory 64 may also be provided to power control circuitry 70. Power control circuitry 70 may process the digital image data to determine whether or not subsequent exposures will produce useful data. After determining whether or not subsequent exposures will produce useful data (e.g., by comparing the digital image data to one or more thresholds), the power control circuitry may provide power control signals to the ADCs 62 and memory 64. Each ADC in ADCs 62 may receive a respective control signal from power control circuitry 70 that either enables or disables the ADC. Similarly, each memory circuit in memory 64 may receive a respective control signal from power control circuitry 70 that either enables or disables the memory circuit. In this way, power control circuitry selectively enables and disables ADCs 62 and memory 64 to conserve power during exposures that are not expected to produce useful data. Buffer 66, processing circuitry 68, and power control circuitry 70 may be considered part of control and processing circuitry 44.

Image data may be read out from pixel array 32 row-by-row. This means that the image data for a given row is read out simultaneously (e.g., using ADCs 62 and memory 64). In one example, power control circuitry 70 may examine each pixel individually to determine which portions of ADCs 62 and memory 64 should be disabled. For example, power control circuitry 70 may make the determination of whether or not subsequent exposures will provide useful information on a per-pixel basis. However, this example is merely illustrative. If desired, power control circuitry 70 may group pixels together and determine of whether or not subsequent exposures will provide useful information on a per-pixel-group basis.

When analyzing groups of pixels together, power control circuitry 70 may determine whether not to disable portions of ADCs 62 and memory 64 that are associated with the group of pixels. There are many possible ways that power control circuitry 70 can analyze the group of pixels. The power control circuitry may disable the corresponding portions of ADCs 62 and memory 64 if all of the pixel outputs in the pixel group are below the threshold. Alternatively, the power control circuitry may take the average (or median) of all of the pixel outputs in the pixel group and disable the corresponding portions of ADCs 62 and memory 64 if the average (or median) is below the threshold. Each group of pixels may include pixels from one or more rows and one or more columns. The group of pixels may include pixels from one row, two rows, four rows, more than two rows, more than ten rows, more than twenty-five rows, more than one hundred rows, more than five hundred rows, etc. The group of pixels may include pixels from one column, two columns, four columns, more than two columns, more than ten columns, more than twenty-five columns, more than one hundred columns, more than five hundred columns, etc.

The power control circuitry may have an array of values that indicate which portions of the ADCs and memory to enable and disable. For example, the power control circuitry may have an array of values and each value may be associated with a corresponding ADC and memory circuit. Each value may be either '1' to indicate that the upcoming exposure is expected to have useful data and therefore the ADC/memory circuit should be enabled during readout of data from that exposure or '0' to indicate that the upcoming exposure is not expected to have useful data and therefore the ADC/memory circuit should be disabled during readout of data from that exposure.

If power control circuitry 70 determines that an ADC may be disabled because an upcoming exposure will not produce useful data, the ADC may be selectively disabled to reduce power as much as possible while maintaining consistent loading on the analog signal chain.

When disabled, a corresponding memory circuit (sometimes referred to as a memory block) in memory 64 will revert to outputting a default value (e.g., 0). This way, the pixel for which the ADC and memory have been disabled will have associated digital data (without using the power to actually convert the analog image data to digital image data using the ADC). Processing circuitry 68 will receive the default values and proceed as usual (e.g., the processing circuitry 68 can process the incoming digital image data the same way without needing to be separately informed which ADC and memory portions are disabled).

The example of 0 as a default value is merely illustrative. If desired, a different default value may be used (e.g., depending on whether the first exposure is the longest exposure or shortest exposure). Additionally, processing circuitry 68 may optionally recognize the default value and take additional processing steps to restore the default value to any desired digital value. For example, in the scenario where the shortest exposure is first, data from the first exposure may be higher than a threshold (indicating that subsequent exposures will be saturated and not provide useful information). The memory circuit may be disabled for the subsequent exposures and have a default output that is associated with the saturated level. Alternatively, the memory circuit may be disabled for the subsequent exposures and have a default output of '0'. Processing circuitry 68 may then know that the default output of '0' actually indicates that the exposure would have been saturated and process the data accordingly.

Figure 4:
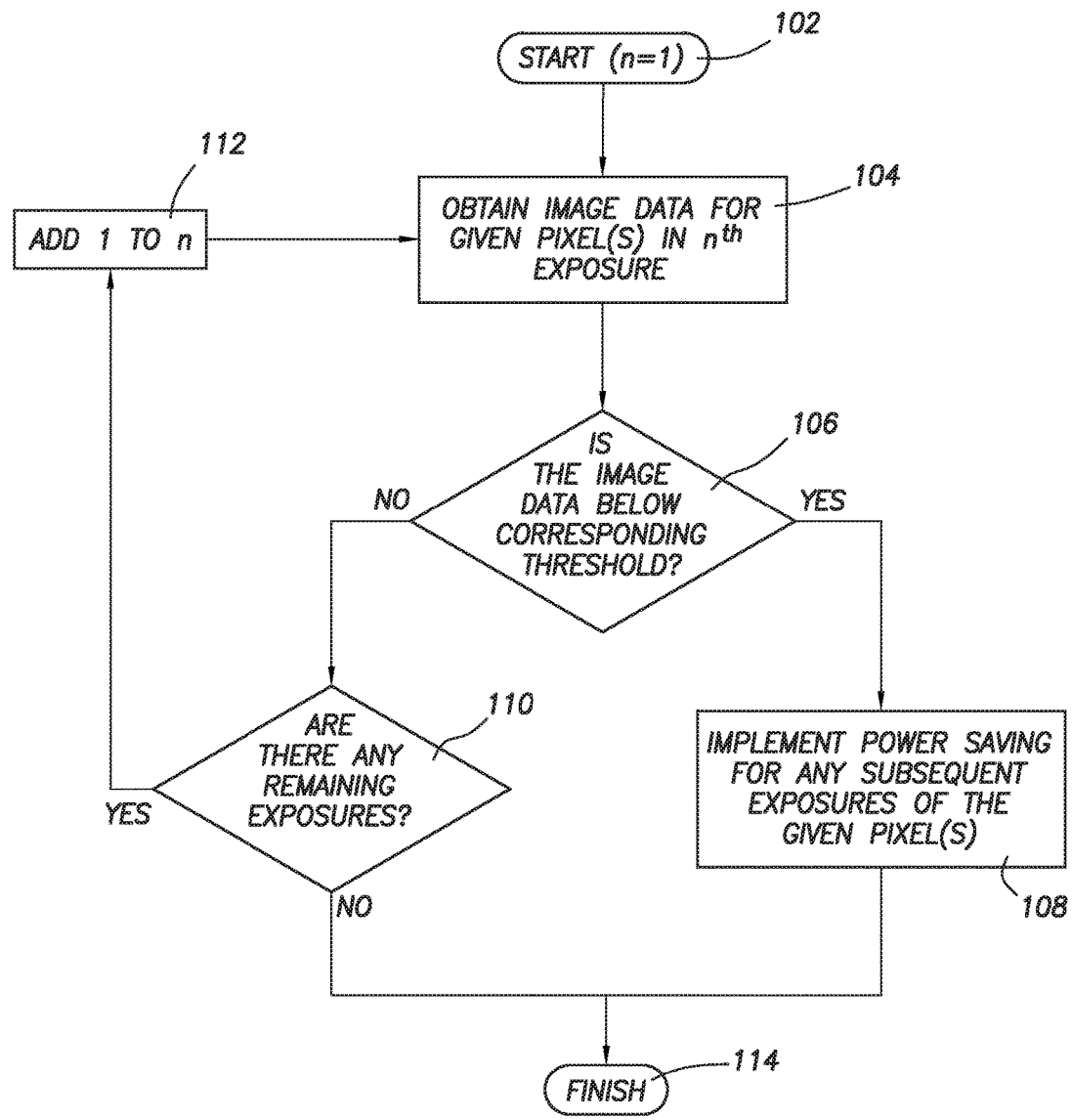
FIG. 4 is a flowchart showing an illustrative method of operating an image sensor to selectively disable readout circuitry in accordance with an embodiment.

FIG. 4 is a flowchart of illustrative steps for operating an image sensor of the type shown in FIG. 3 to determine whether or not subsequent exposures in a multi-exposure imaging scheme are expected to produce useful data. The method begins at step 102, where n (the exposure number) is set equal to 1. Next, at step 104, image data is obtained for a given pixel (or group of pixels) in the $n^{th}$ exposure (e.g., the $1^{st}$ exposure). The image data may be obtained by the pixel(s) in pixel array 32 and output to an analog-to-digital converter. Next, at step 106, the obtained image data (for the given pixel in the $n^{th}$ exposure) is compared to a corresponding threshold (e.g., by power control circuitry 70). If the image data is not lower than (e.g., is higher than) the corresponding threshold, the power control circuitry may proceed to step 110. At step 110, the power control circuitry may determine whether there are any remaining exposures for the given pixel(s). If not, the method finishes at step 114 (and will be repeated for the next pixel or group of pixels). However, if there are remaining exposures, the method may loop back to step 104 (adding 1 to n at step 112). The process may then be repeated for each remaining exposure for the given pixel(s).

If, at step 106, power control circuitry 70 determines that the image data is lower than the corresponding threshold, the power control circuitry may implement power saving measures at step 108. In step 108, the power control circuitry may disable circuitry (e.g., readout circuitry such as ADCs 62 and memory 64) that is associated with the given pixel(s). The process may then finish at step 114 (and will be repeated for the next pixel or group of pixels).

The example of considering if the image data is below a threshold in step 110 is merely illustrative. As previously discussed, if the first exposure is the longest exposure time, power saving measures may be implemented if the image data is less than the threshold. However, if the first exposure is the shortest exposure time power saving measures may be implemented if the image data is higher than the threshold. So, in an alternative embodiment, step 110 in FIG. 4 may instead be to determine if the image data is above a corresponding threshold. Although these examples are discussed herein, the first exposure time need not be the longest or shortest exposure time. For example, the first exposure time may be an intermediate exposure time. Data from the intermediate exposure time may be compared to two thresholds to determine possible power saving during subsequent exposures, for example.

Any desired threshold may be used for comparison to the image data by power control circuitry 70. There may be a corresponding threshold for each exposure. For example, in a three exposure imaging scheme there would be three respective thresholds. The image sensor may also have different conversion gain settings. In general, pixel conversion gain is inversely proportional to the amount of loading capacitance at the floating diffusion node FD of the pixel. The capacitance coupled to the floating diffusion node may therefore be selected to control the conversion gain of the pixel. When the floating diffusion node is coupled to a higher capacitance, the pixel will have a lower conversion gain. When the floating diffusion node is coupled to a lower capacitance, the pixel will have a higher conversion gain.

The thresholds used by power control circuitry 70 may be dependent upon the conversion gain of the pixel as well as the exposure. For example, if the pixel had four different gain settings and four different exposures, sixteen predetermined thresholds may be available for comparison.

The example of disabling portions of ADCs 62 and memory 64 are merely illustrative. Other components within the image sensor may be disabled at step 108. For example, column amplifiers for amplifying signals read out from array 32 and/or sample and hold circuitry for sampling and storing signals read out from array 32 may be selectively disabled for power conservation (e.g., in step 108). In yet another embodiment, portions of the pixels may be disabled in step 108.

In some situations, especially automotive applications, care may need to be taken to avoid errors caused by flickering lighting. Examples of objects with changing illumination (e.g., flickering lighting) in an image frame include light-emitting diode (LED) traffic signs (which can flicker several hundred times per second) and LED brake lights or headlights of modern cars.

In cases such as these, power control circuitry 70 may take additional steps to avoid errors caused by flickering lighting. For example, if the image data from the first exposure indicates that no useful data is expected from subsequent exposures, this may be due to a flickering light that is 'off' during the first exposure but will turn back on during the second exposure. If power control circuitry 70 does not actually readout data from the second exposure, however, this flickering light may be incorrectly absent from the final output image. To help avoid these errors, power control circuitry may take any desired steps. In one illustrative example, power control circuitry 70 may only disable a pixel or group of pixels if the image data does not meet a threshold requirement for two consecutive exposures (not just one exposure). Power control circuitry may use the image data from the first and second exposures to determine whether or not useful data is expected from the third exposure, for example.

In another possible embodiment, image data from previous frames may be considered when determining whether or not to disable readout circuitry. For example, power control circuitry may determine that for a given pixel in a given frame, the image data from the first exposure indicates that no useful data is expected in the second exposure. The power control circuitry may look at the image data from the first and second exposures of one or more frames previous to the given frame. If no useful data was obtained in the second exposure for the one or more previous frames, the power control circuitry may then disable the readout circuitry during the second exposure. If useful data was obtained in the second exposure for the one or more previous frames, the power control circuitry may not disable the readout circuitry for the second exposure.

These examples are merely illustrative and any desired analysis may be performed to determine whether or not to disable portions of the readout circuitry. In general, the power control circuitry may receive image data from one or more pixel(s) for a given frame. Based on the pixel data from one or more exposures for the pixel(s) in the given frame and/or previous frames, the power control circuitry may disable any desired circuitry in the image sensor (e.g., readout circuitry associated with the pixel(s)) for subsequent exposures of the pixel(s) in the given frame.

In various embodiments, an image sensor may include a pixel array that includes rows and columns of imaging pixels, wherein the imaging pixels are configured to capture image data in an image frame using at least first and second exposures, readout circuitry coupled to the pixel array, wherein the readout circuitry is configured to, for each exposure, read analog image data from the pixel array, convert the analog image data to digital image data, and output the digital image data, and control circuitry configured to receive digital image data associated with the first exposure and selectively disable the readout circuitry during a readout of the second exposure based on the digital image data associated with the first exposure.

The readout circuitry may include a plurality of analog-to-digital converters and memory. The readout circuitry may be configured to selectively disable the plurality of analog-to-digital converters and the memory during a readout of the second exposure based on the digital image data associated with the first exposure. The image sensor may also include a buffer that is configured to receive the digital image data from the memory. Portions of the memory that are disabled may output a default value to the buffer. The image sensor may also include processing circuitry that is configured to receive the digital image data from the buffer. The processing circuitry may be configured to combine the digital image data from each exposure into a single high dynamic range image value.

The control circuitry may be configured to compare the digital image data associated with the first exposure to at least one threshold and the control circuitry may be configured to selectively disable the readout circuitry during the readout of the second exposure based on a comparison of the digital image data associated with the first exposure to the at least one threshold. The digital image data associated with the first exposure may include a plurality of digital image data values each associated with a respective imaging pixel and the control circuitry may be configured to compare each digital image data value to a threshold and disable the readout circuitry associated with the imaging pixel associated with the respective digital image data value if the digital image data value is less than the threshold. The digital image data associated with the first exposure may include a plurality of digital image data values each associated with a respective imaging pixel and the control circuitry may be configured to compare each digital image data value to a threshold and disable the readout circuitry associated with the imaging pixel associated with the respective digital image data value if the digital image data value is greater than the threshold. The digital image data associated with the first exposure may include a plurality of sets of digital image data values each associated with a respective subset of imaging pixels and the control circuitry may be configured to compare each set of the digital image data values to the at least one threshold and disable the readout circuitry associated with the subset of imaging pixels associated with the respective set of digital image data values based on the comparison.

In various embodiments, a method of operating an image sensor with a plurality of imaging pixels comprises obtaining image data for at least one imaging pixel of the plurality of imaging pixels in an exposure, comparing the image data for the at least one imaging pixel to a threshold, and disabling readout circuitry associated with the at least one imaging pixel for at least one subsequent exposure based on the comparison between the image data for the at least one imaging pixel and the threshold.

The exposure may be longer than the at least one subsequent exposure, comparing the image data for the at least one imaging pixel to the threshold may comprise determining if the image data for the at least one imaging pixel is below the threshold, and disabling the readout circuitry associated with the at least one imaging pixel for the at least one subsequent exposure based on the comparison between the image data for the at least one imaging pixel and the threshold may comprise disabling the readout circuitry associated with the at least one imaging pixel for the at least one subsequent exposure in response to determining that the image data for the at least one imaging pixel is below the threshold.

The method may also include obtaining additional image data for at least one additional imaging pixel of the plurality of imaging pixels in the exposure, comparing the additional image data for the at least one additional imaging pixel to the threshold, and enabling readout circuitry associated with the at least one additional imaging pixel for the at least one subsequent exposure based on the comparison between the additional image data for the at least one additional imaging pixel and the threshold. Comparing the additional image data for the at least one additional imaging pixel to the threshold may comprise determining if the additional image data for the at least one additional imaging pixel is below the threshold and enabling the readout circuitry associated with the at least one additional imaging pixel for the at least one subsequent exposure based on the comparison between the additional image data for the at least one additional imaging pixel and the threshold may comprise enabling the readout circuitry associated with the at least one additional imaging pixel for the at least one subsequent exposure in response to determining that the additional image data for the at least one imaging pixel is not below the threshold. The exposure may be a first exposure and the at least one subsequent exposure may include a second exposure and a third exposure. The method may also include obtaining second additional image data for the at least one additional imaging pixel of the plurality of imaging pixels in the second exposure, comparing the second additional image data for the at least one additional imaging pixel to a second threshold, and disabling readout circuitry associated with the at least one additional imaging pixel for the third exposure based on the comparison between the second image data for the at least one additional imaging pixel and the second threshold.

The exposure may be shorter than the at least one subsequent exposure, comparing the image data for the at least one imaging pixel to the threshold may comprise determining if the image data for the at least one imaging pixel is above the threshold, and disabling the readout circuitry associated with the at least one imaging pixel for the at least one subsequent exposure based on the comparison between the image data for the at least one imaging pixel and the threshold may comprise disabling the readout circuitry associated with the at least one imaging pixel for the at least one subsequent exposure in response to determining that the image data for the at least one imaging pixel is above the threshold.

A method of operating an image sensor comprising an array of imaging pixels, readout circuitry coupled to the array of imaging pixels, and control circuitry, may include with at least one imaging pixel in the array of imaging pixels, capturing first image data during a first exposure time for a first image frame, with the readout circuitry, reading out the first image data from the at least one imaging pixel, with the at least one imaging pixel, capturing second image data during a second exposure time that is different than the first exposure time for the first image frame, with the readout circuitry, reading out the second image data from the at least one imaging pixel, and with the control circuitry, selectively disabling the readout circuitry while the readout circuitry reads out the second image data from the at least one imaging pixel based on the first image data.

The method may also include with the control circuitry, comparing values of the first image data to a threshold to determine which portions of the readout circuitry to disable while the readout circuitry reads out the second image data from the at least one imaging pixel. The at least one imaging pixel may include imaging pixels in at least first and second rows and first and second columns of the array of imaging pixels.

The foregoing is merely illustrative of the principles of this invention and various modifications can be made by those skilled in the art without departing from the scope and spirit of the invention. The foregoing embodiments may be implemented individually or in any combination.

What is claimed is:

1. An image sensor comprising:
a pixel array that includes rows and columns of imaging pixels, wherein the imaging pixels are configured to capture image data in an image frame using at least first and second exposures;
readout circuitry coupled to the pixel array, wherein the readout circuitry is configured to, for each exposure, read analog image data from the pixel array, convert the analog image data to digital image data, and output the digital image data; and
control circuitry configured to receive digital image data associated with the first exposure and selectively disable the readout circuitry during a readout of the second exposure based on the digital image data associated with the first exposure.

2. The image sensor defined in claim 1, wherein the readout circuitry comprises a plurality of analog-to-digital converters and memory.

3. The image sensor defined in claim 1, wherein the readout circuitry is configured to selectively disable the plurality of analog-to-digital converters and the memory during a readout of the second exposure based on the digital image data associated with the first exposure.

4. The image sensor defined in claim 3, further comprising a buffer that is configured to receive the digital image data from the memory.

5. The image sensor defined in claim 3, wherein portions of the memory that are disabled output a default value to the buffer.

6. The image sensor defined in claim 5, further comprising processing circuitry that is configured to receive the digital image data from the buffer.

7. The image sensor defined in claim 6, wherein the processing circuitry is configured to combine the digital image data from each exposure into a single high dynamic range image value.

8. The image sensor defined in claim 1, wherein the control circuitry is configured to compare the digital image data associated with the first exposure to at least one threshold, and wherein the control circuitry is configured to selectively disable the readout circuitry during the readout of the second exposure based on a comparison of the digital image data associated with the first exposure to the at least one threshold.

9. The image sensor defined in claim 8, wherein the digital image data associated with the first exposure comprises a plurality of digital image data values each associated with a respective imaging pixel and wherein the control circuitry is configured to compare each digital image data value to a threshold and disable the readout circuitry associated with the imaging pixel associated with the respective digital image data value if the digital image data value is less than the threshold.

10. The image sensor defined in claim 8, wherein the digital image data associated with the first exposure comprises a plurality of digital image data values each associated with a respective imaging pixel and wherein the control circuitry is configured to compare each digital image data value to a threshold and disable the readout circuitry associated with the imaging pixel associated with the respective digital image data value if the digital image data value is greater than the threshold.

11. The image sensor defined in claim 8, wherein the digital image data associated with the first exposure comprises a plurality of sets of digital image data values each associated with a respective subset of imaging pixels and wherein the control circuitry is configured to compare each set of the digital image data values to the at least one threshold and disable the readout circuitry associated with the subset of imaging pixels associated with the respective set of digital image data values based on the comparison.

12. A method of operating an image sensor with a plurality of imaging pixels, comprising:
    obtaining image data for at least one imaging pixel of the plurality of imaging pixels in an exposure;
    comparing the image data for the at least one imaging pixel to a threshold; and
    disabling readout circuitry associated with the at least one imaging pixel for at least one subsequent exposure based on the comparison between the image data for the at least one imaging pixel and the threshold.

13. The method defined in claim 12, wherein the exposure is longer than the at least one subsequent exposure, wherein comparing the image data for the at least one imaging pixel to the threshold comprises determining if the image data for the at least one imaging pixel is below the threshold, and wherein disabling the readout circuitry associated with the at least one imaging pixel for the at least one subsequent exposure based on the comparison between the image data for the at least one imaging pixel and the threshold comprises disabling the readout circuitry associated with the at least one imaging pixel for the at least one subsequent exposure in response to determining that the image data for the at least one imaging pixel is below the threshold.

14. The method defined in claim 13, further comprising:
    obtaining additional image data for at least one additional imaging pixel of the plurality of imaging pixels in the exposure;
    comparing the additional image data for the at least one additional imaging pixel to the threshold; and
    enabling readout circuitry associated with the at least one additional imaging pixel for the at least one subsequent exposure based on the comparison between the additional image data for the at least one additional imaging pixel and the threshold.

15. The method defined in claim 14, wherein comparing the additional image data for the at least one additional imaging pixel to the threshold comprises determining if the additional image data for the at least one additional imaging pixel is below the threshold and wherein enabling the readout circuitry associated with the at least one additional imaging pixel for the at least one subsequent exposure based on the comparison between the additional image data for the at least one additional imaging pixel and the threshold comprises enabling the readout circuitry associated with the at least one additional imaging pixel for the at least one subsequent exposure in response to determining that the additional image data for the at least one imaging pixel is not below the threshold.

16. The method defined in claim 15 wherein the exposure is a first exposure and the at least one subsequent exposure includes a second exposure and a third exposure, the method further comprising:
    obtaining second additional image data for the at least one additional imaging pixel of the plurality of imaging pixels in the second exposure;
    comparing the second additional image data for the at least one additional imaging pixel to a second threshold; and
    disabling readout circuitry associated with the at least one additional imaging pixel for the third exposure based on the comparison between the second image data for the at least one additional imaging pixel and the second threshold.

17. The method defined in claim 12, wherein the exposure is shorter than the at least one subsequent exposure, wherein comparing the image data for the at least one imaging pixel to the threshold comprises determining if the image data for the at least one imaging pixel is above the threshold, and wherein disabling the readout circuitry associated with the at least one imaging pixel for the at least one subsequent exposure based on the comparison between the image data for the at least one imaging pixel and the threshold comprises disabling the readout circuitry associated with the at least one imaging pixel for the at least one subsequent exposure in response to determining that the image data for the at least one imaging pixel is above the threshold.

18. A method of operating an image sensor comprising an array of imaging pixels, readout circuitry coupled to the array of imaging pixels, and control circuitry, the method comprising:
    with at least one imaging pixel in the array of imaging pixels, capturing first image data during a first exposure time for a first image frame;
    with the readout circuitry, reading out the first image data from the at least one imaging pixel;
    with the at least one imaging pixel, capturing second image data during a second exposure time for the first image frame, wherein the second exposure time is different than the first exposure time;
    with the readout circuitry, reading out the second image data from the at least one imaging pixel; and
    with the control circuitry, selectively disabling the readout circuitry while the readout circuitry reads out the second image data from the at least one imaging pixel based on the first image data.

19. The method defined in claim 18, further comprising:
    with the control circuitry, comparing values of the first image data to a threshold to determine which portions of the readout circuitry to disable while the readout circuitry reads out the second image data from the at least one imaging pixel.

20. The method defined in claim 18, wherein the at least one imaging pixel includes imaging pixels in at least first and second rows and first and second columns of the array of imaging pixels.

* * * * *